Patented Jan. 2, 1923.

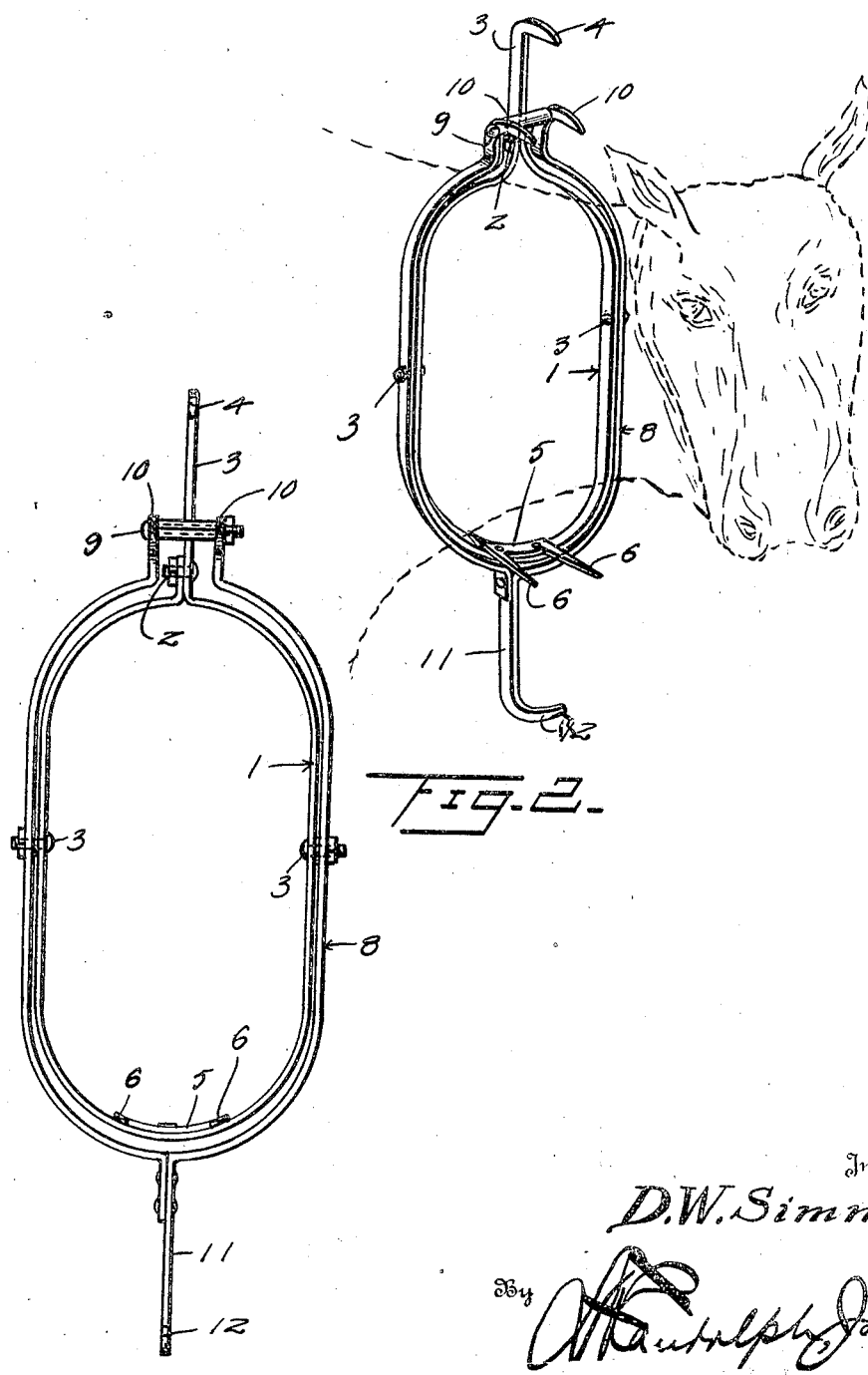

1,441,127

UNITED STATES PATENT OFFICE.

DAVID W. SIMMONS, OF ERICK, OKLAHOMA.

ANIMAL POKE.

Application filed December 21, 1921. Serial No. 523,940.

*To all whom it may concern:*

Be it known that I, DAVID W. SIMMONS, a citizen of the United States, residing at Erick, in the county of Beckham and State of Oklahoma, have invented certain new and useful Improvements in Animal Pokes; and I do hereby declare the following to be a full, clear, and exact description of the invention, such as will enable others skilled in the art to which it appertains to make and use the same.

The invention has relation to means for confining stock to an enclosure and preventing the same from leaping over a fence or passing between the elements thereof, the device comprising similar complemental members adapted to be fitted about the neck of the animal between the head and shoulders, said members being pivotally connected, and one of the members having a vertical extension terminating at its upper end in a forwardly disposed spur or point and the other member having a downwardly projecting extension terminating at its lower end in a forwardly disposed spur or point, the opposite ends of the respective members being provided with forwardly extending spurs or points which are adapted to prick the animal and compel it to desist from a continued attempt to leave the enclosure.

Other objects and advantages will be apparent and suggest themselves as the nature of the invention is understood.

While the drawings illustrate an embodiment of the invention, it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a perspective view of an animal poke embodying the invention, showing the same applied, the head and shoulders of the animal being indicated by dotted lines, and Figure 2 is a front view of the device.

Corresponding and like parts are referred to in the following description and designated in both views of the drawings by like reference characters.

While the device is particularly designed for stock, such as cows, it is to be understood that it may be applied to other animals to prevent them leaving an enclosure.

The device comprises similar inner and outer members of yoke form to be fitted about the neck of an animal, as indicated by the dotted lines in Figure 1. The members are preferably formed from strips of metal of suitable gage to provide a substantial, effective and light article. The inner member 1 is preferably formed from a single strip which is bent into the form of a loop or yoke, the end portions being brought together and secured by means of a bolt 2 or analogous fastening. One of the ends of the strip is extended vertically, as indicated at 3, and terminates at its upper end in a forwardly extending spur or point 4. A short plate 5 is attached to the lower end of the member 1 and is provided with forwardly extending spurs or points 6.

The outer member comprises two parts 7 and 8 which are outwardly bowed and connected at opposite ends. The upper ends of the parts 7 and 8 are connected by means of a bolt or like fastening 9 and terminate in forwardly extending spurs or points 10. The bolt or fastening 9 is disposed forwardly of the extension 3. The lower end of the part 7 is projected downwardly, as indicated at 11, and terminates at its lower end in a forwardly extending spur or point 12. The two yokes or members are pivotally connected at opposite sides, a short distance above a central point, as indicated at 13.

When the bolts or fastenings 2 and 9 are removed, the members may be spread at their upper ends so as to be fitted about the neck of the animal, after which said fastenings are replaced, whereby to secure the ends of the members and retain the device in position, as indicated in Figure 1 of the drawings.

When the device is in position, an attempt of the animal to pass beneath an enclosing element such as a wire, rail or the like, will cause the vertical extension 3 to engage such element and effect a pivotal movement of the inner member, whereby its lower end is thrown upwardly and forwardly whereby to cause the spurs or points 6 to prick the under side of the neck. Should the animal attempt to pass over a barrier, the depending extension 11 will engage therewith and effect a pivotal movement of the outer member, whereby the spurs or points 10 are thrown forwardly and downwardly, so as to prick the upper portion of the neck. In either event, the effect is to compel the animal to desist from a continued attempt to escape, as will be readily understood.

What is claimed is:

1. An animal poke comprising similar members of loop or yoke form pivotally connected at opposite sides and separable at one end, means for securing the separable ends of the members when the device is in position, the inner member having a vertical extension terminating at its upper end in a forwardly projecting spur, and the outer member having a depending extension terminating at its lower end in a forwardly extending spur, the opposite ends of the members having forwardly extending spurs.

2. An animal poke comprising similar members of loop or yoke form pivotally connected at opposite sides and separable at one end, means for securing the separable ends of the members when the device is in position, the inner member having a vertical extension terminating at its upper end in a forwardly projecting spur and the outer member having a depending extension terminating at its lower end in a forwardly extending spur, the opposite ends of the members having forwardly extending spurs, the inner member comprising a single strip, and the outer member embodying two strips which are outwardly bowed, the lower ends of the strips being permanently connected.

In testimony whereof I affix my signature in presence of two witnesses.

DAVID W. SIMMONS.

Witnesses:
J. W. Dennis,
R. O. Haddock.